US012218475B2

(12) United States Patent
Kanematsu et al.

(10) Patent No.: US 12,218,475 B2
(45) Date of Patent: Feb. 4, 2025

(54) CONNECTOR

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Yuta Kanematsu, Mie (JP); Junichi Mukuno, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 344 days.

(21) Appl. No.: 17/909,556

(22) PCT Filed: Feb. 25, 2021

(86) PCT No.: PCT/JP2021/007084
§ 371 (c)(1),
(2) Date: Sep. 6, 2022

(87) PCT Pub. No.: WO2021/187037
PCT Pub. Date: Sep. 23, 2021

(65) Prior Publication Data

US 2023/0114288 A1 Apr. 13, 2023

(30) Foreign Application Priority Data

Mar. 18, 2020 (JP) ................................. 2020-047453

(51) Int. Cl.
*H01R 9/18* (2006.01)
*H01R 11/11* (2006.01)

(52) U.S. Cl.
CPC ................ *H01R 9/18* (2013.01); *H01R 11/11* (2013.01)

(58) Field of Classification Search
CPC ........ H01R 9/18; H01R 11/11; H01R 13/748; H01R 4/34
See application file for complete search history.

(56) References Cited

U.S. PATENT DOCUMENTS 3,018,320 A * 1/1962 Rowe ........................ H02G 5/06 439/213
2016/0134060 A1 5/2016 Hwang
(Continued)

FOREIGN PATENT DOCUMENTS

JP 2004-231452 A 8/2004
JP 2017-085300 A 5/2017
WO 2017/110789 A1 6/2017

OTHER PUBLICATIONS

International Search Report issued on Apr. 27, 2021 for WO 2021/187037 A1 (5 pages).

*Primary Examiner* — Briggitte R. Hammond
(74) *Attorney, Agent, or Firm* — Venjuris, P.C.

(57) ABSTRACT

One aspect of the present disclosure is to provide a connector enabling good heat dissipation. A connector 11 according to the one aspect of the present disclosure is provided with a housing 13 made of metal, a flat plate-like busbar 14 to be held in the housing 13, a first ceramic member 18 to be interposed between one flat surface 14*a* of the busbar 14 and a first contact portion 17 of the housing 13, a second ceramic member 20 to be interposed between another flat surface 14*a* of the busbar 14 and a second contact portion 19 of the housing 13, and a bolt 21 and a nut 22 for collectively fastening the busbar 14, the first and second ceramic members 18, 20 and the first and second contact portions 17, 19.

5 Claims, 2 Drawing Sheets

(56) References Cited

U.S. PATENT DOCUMENTS

| | | | |
|---|---|---|---|
| 2018/0054026 | A1 | 2/2018 | Nolting et al. |
| 2019/0166683 | A1 | 5/2019 | Nakamura et al. |
| 2019/0260143 | A1 | 8/2019 | Yukawa et al. |
| 2019/0312387 | A1 | 10/2019 | Nolting et al. |

* cited by examiner

CONNECTOR

CROSS REFERENCE TO RELATED APPLICATIONS

This application is a national phase of PCT application No. PCT/JP2021/007084, filed on 25 Feb. 2021, which claims priority from Japanese patent application No. 2020-047453, filed on 18 Mar. 2020, all of which are incorporated herein by reference.

TECHNICAL FIELD

The present disclosure relates to a connector.

BACKGROUND

Conventionally, a connector is known which includes a housing made of metal, a conductor held in the housing and an intermediate insulating portion provided between the conductor and the housing (see, for example, Patent Document 1). In such a connector, the heat dissipation of a busbar is improved if the intermediate insulating portion is a ceramic member having a high thermal conductivity.

PRIOR ART DOCUMENT

Patent Document

Patent Document 1: JP 2018-510462 A

SUMMARY OF THE INVENTION

Problems to be Solved

However, in the above connector, a tiny gap may be formed between the busbar and the housing due to dimensional errors and a difference in coefficient of liner expansion by a configuration in which the ceramic member is merely placed adjacent to the busbar and the housing, and there has been a problem that thermal contact resistance increases to deteriorate heat dissipation.

The present disclosure aims to provide a connector enabling good heat dissipation.

Means to Solve the Problem

The present disclosure is directed to a connector with a housing made of metal, a flat plate-like busbar to be held in the housing, a first ceramic member to be interposed between one flat surface of the busbar and a first contact portion of the housing, a second ceramic member to be interposed between another flat surface of the busbar and a second contact portion of the housing, and a fastening member for collectively fastening the busbar, the first and second ceramic members and the first and second contact portions.

Effect of the Invention

According to the connector of the present disclosure, good heat dissipation is enabled.

DETAILED DESCRIPTION TO EXECUTE THE INVENTION

Description of Embodiments of Present Disclosure

Figure 1:
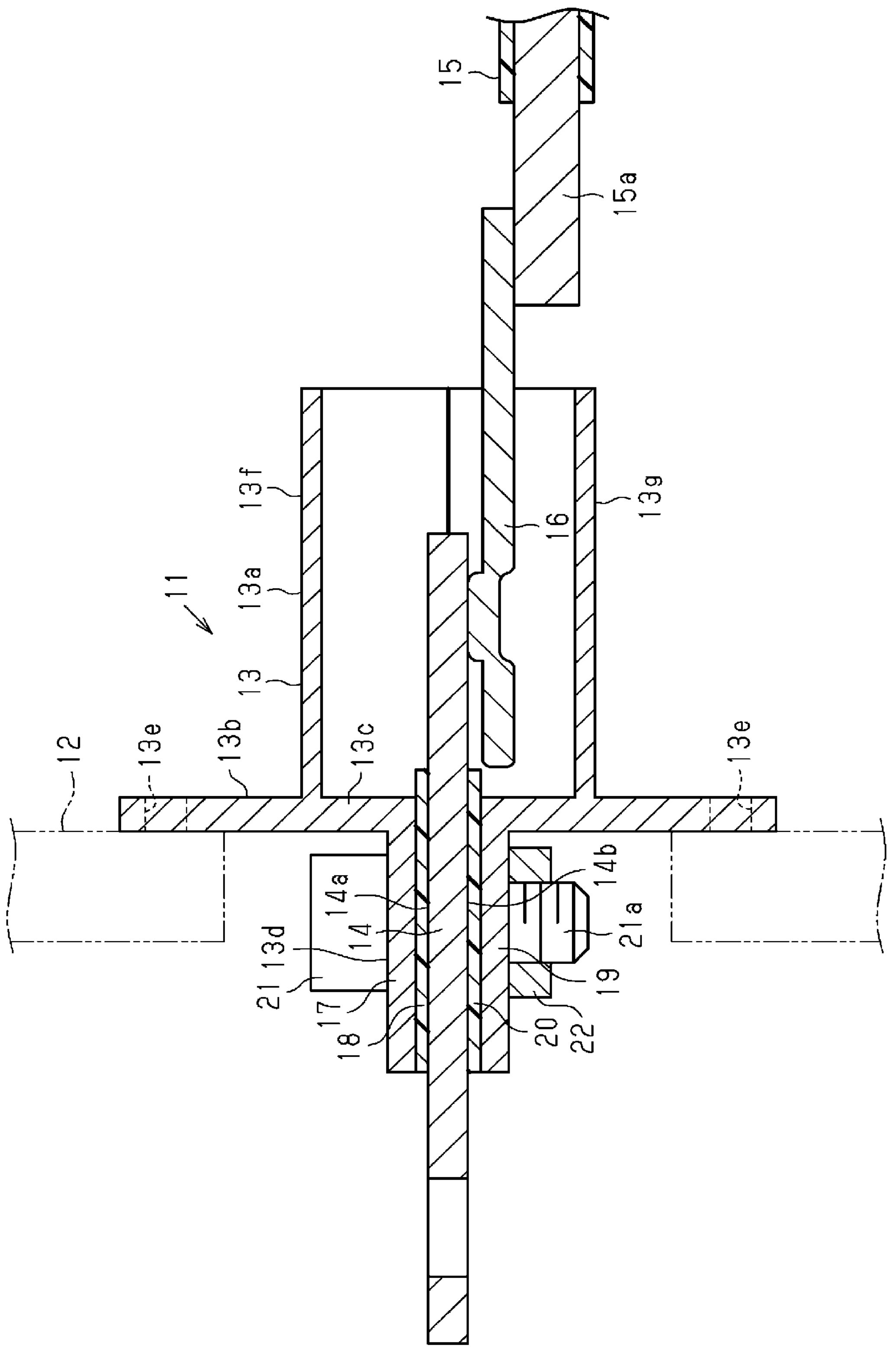
FIG. 1 is a section of a connector in one embodiment.

First, embodiments of the present disclosure are listed and described.

[1] The connector of the present disclosure is provided with a housing made of metal, a flat plate-like busbar to be held in the housing, a first ceramic member to be interposed between one flat surface of the busbar and a first contact portion of the housing, a second ceramic member to be interposed between another flat surface of the busbar and a second contact portion of the housing, and a fastening member for collectively fastening the busbar, the first and second ceramic members and the first and second contact portions.

According to this configuration, the busbar, the first and second ceramic members and the first and second contact portions are collectively fastened by the fastening member. Thus, the one flat surface of the busbar is maintained in contact with the first contact portion of the housing via the first ceramic member having a high thermal conductivity without any gap, the other flat surface of each busbar is maintained in contact with the second contact portion of the housing via the second ceramic member having a high thermal conductivity without any gap, and the heat dissipation of the busbar is improved.

[2] Preferably, the fastening member is composed of a bolt and a nut.

According to this configuration, since the fastening member is composed of the bolt and the nut, the busbar, the first and second ceramic members and the first and second contact portions can be easily collectively fastened by the fastening member. Further, a fastening torque is easily controlled, for example, as compared to the case where the fastening member is a rivet or the like.

[3] Preferably, a pair of the busbars are provided, each of the first and second contact portions is provided over the pair of busbars, and the fastening member fastens the first and second contact portions between the pair of busbars.

Since each of the first and second contact portions is provided over the pair of busbars and the first and second contact portions are fastened between the pair of busbars by the fastening member, the pair of busbars can be respectively fastened together with the first and second ceramic members by one fastening member. That is, the number of components of the fastening member can be reduced as compared to the case where the fastening member is provided for each busbar.

[4] Preferably, a pair of the busbars are provided, each of the first and second contact portions is provided over the pair of busbars, and each of the first and second ceramic members is provided over the pair of busbars.

According to this configuration, since each of the first and second contact portions is provided over the pair of busbars and each of the first and second ceramic members is provided over the pair of busbars, the number of components can be reduced, for example, as compared to the case where the first and second ceramic members are provided for each busbar.

[5] Preferably, facing surfaces of the first and second ceramic members facing the busbar is set equal to or longer than a length of the busbar in a width direction of the busbar.

According to this configuration, since the facing surfaces of the first and second ceramic members facing the busbars are set equal to or longer than the length of the busbar in the width direction of the busbar, the busbar can be stably sandwiched by the first and second ceramic members. Further, since the busbar can be entirely in contact with the first and second ceramic members in the width direction, heat dissipation is improved.

Details of Embodiment of Present Disclosure

A specific example of a connector of the present disclosure is described below with reference to the drawings. Note that the present invention is not limited to these illustrations and is intended to be represented by claims and include all changes in the scope of claims and in the meaning and scope of equivalents.

As shown in FIG. 1, a connector 11 is provided with a housing 13 to be connected to an electrical device 12 such as an inverter and flat plate-like busbars 14 held in the housing 13.

The housing 13 is made of metal and, in this embodiment, made of aluminum. The housing 13 includes a large tube portion 13*a* substantially in the form of rectangular tubes, a flange portion 13*b* extending in a flange-like manner from an opening of a tip side of the large tube portion 13*a*, an inward extending portion 13*c* extending to an inner side opposite to the flange portion 13*b* from the opening of the tip side of the large tube portion 13*a*, and a small tube portion 13*d* substantially in the form of a rectangular tube extending from the inner edge of the inward extending portion 13*c*. The busbars 14 are held inserted in the large tube portion 13*a* and the small tube portion 13*d*.

Figure 2:
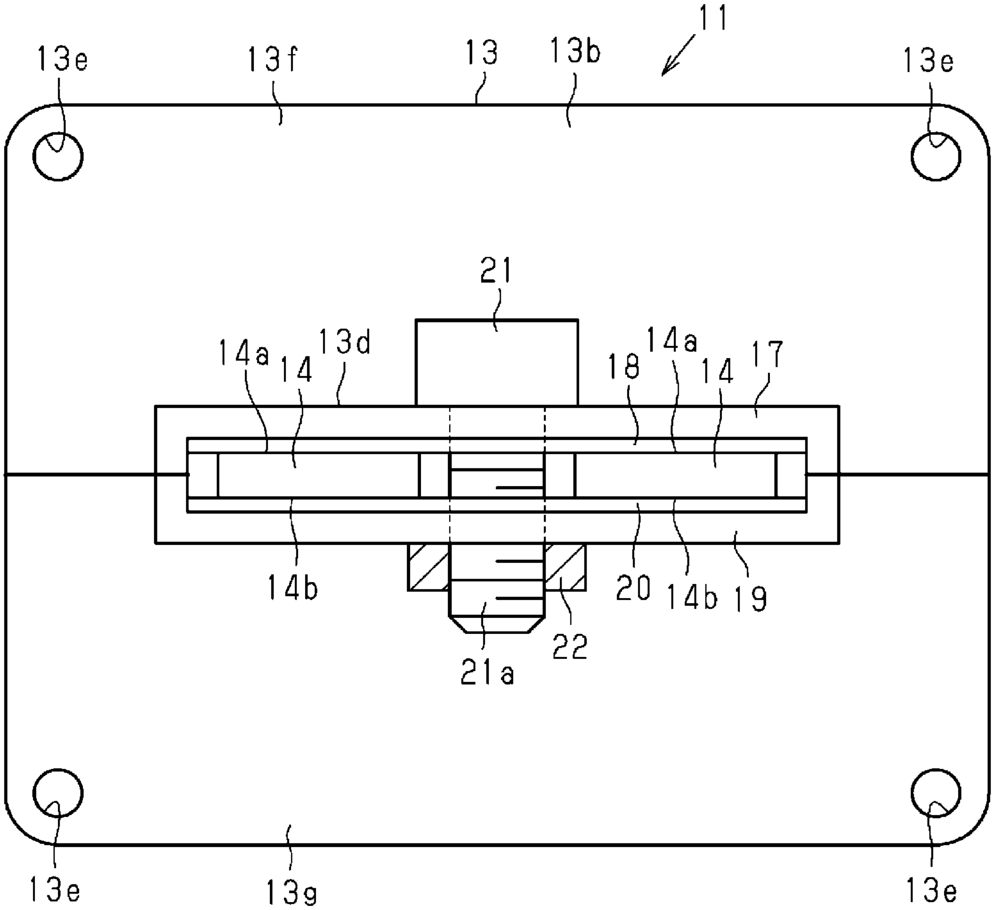
FIG. 2 is a front view of the connector in the embodiment.

As shown in FIG. 2, a pair of the busbars 14 are provided side by side in a width direction thereof. Further, fixing holes 13*e* are provided on four corners of the flange portion 13*b* in the housing 13. The connector 11 is fixed to the electrical device 12 by unillustrated screws to be inserted into the fixing holes 13*e* and threadably engaged with the electrical device 12. Further, the housing 13 of this embodiment is composed of housing constituent members 13*f*, 13*g* shaped by being divided in a direction orthogonal to an arrangement direction of the busbars 14, i.e. in a vertical direction in FIG. 2.

As shown in FIG. 1, a connection terminal 16 fixed to a core wire 15*a* of a wire 15 is connected to a base end side of the busbar 14. A tip side of the busbar 14 projects to the outside of the housing 13 from the small tube portion 13*d* and is connected to an unillustrated connection terminal of the electrical device 12.

Here, the connector 11 of this embodiment includes a first ceramic member 18 interposed between one flat surface 14*a* of each busbar 14 and a first contact portion 17 of the housing 13 and a second ceramic member 20 interposed between another flat surface 14*b* of each busbar 14 and a second contact portion 19 of the housing 13. Further, the connector 11 includes a bolt 21 and a nut 22 as a fastening member for collectively fastening the busbars 14, the first and second ceramic members 18, 20 and the first and second contact portions 17, 19.

In particular, the first and second ceramic members 18, 20 are, for example, made of alumina, have an insulating property, and have a higher thermal conductivity than resin materials and the like. The first and second ceramic members 18, 20 are in the form of flat plates. The first ceramic member 18 is interposed between the one flat surface 14*a* of each busbar 14 and the first contact portion 17, which is the upper wall of the small tube portion 13*d* of the housing 13. The second ceramic member 20 is interposed between the other flat surface 14*b* of each busbar 14 and the second contact portion 19, which is the lower wall of the small tube portion 13*d* of the housing 13.

As shown in FIG. 2, each of the first contact portion 17, which is the upper wall of the small tube portion 13*d*, and the second contact portion 19, which is the lower wall of the small tube portion 13*d*, is provided over the pair of busbars 14. That is, a width of the small tube portion 13*d* is so set that the pair of busbars 14 provided side by side in the width direction can be accommodated inside the small tube portion 13.

Further, each of the first and second ceramic members 18, 20 is provided over the pair of busbars 14. That is, the first ceramic member 18 is provided on the entire inner surface in the width direction of the first contact portion 17, which is the upper wall of the small tube portion 13*d*. Further, the second ceramic member 20 is provided on the entire inner surface in the width direction of the second contact portion 19, which is the lower wall of the small tube portion 13*d*. Note that, by this configuration, facing surfaces of the first and second ceramic members 18, 20 facing the busbars 14 are set equal to or longer than a length of the busbars 14 in the width direction of the busbars 14, and the entire flat surfaces 14*a*, 14*b* of the busbars 14 are in contact with the first and second ceramic members 18, 20 in the width direction.

The bolt 21 and the nut 22 collectively fasten the busbars 14, the first and second ceramic members 18, 20 and the first and second contact portions 17, 19 by fastening the first and second contact portions 17, 19 between the pair of busbars 14. That is, a shaft portion 21*a* of the bolt 21 is passed through the first contact portion 17, the first ceramic member 18, the second ceramic member 20 and the second contact portion 19 in this order between the pair of busbars 14 and threadably engaged with the nut 22. Note that a fastening torque of the bolt 21 and the nut 22 at this time is such a torque that tiny gaps are not formed between the respective members due to dimensional errors, differences in coefficient of liner expansion and the like of the respective members and the heat dissipation of the busbars 14 is maintained.

Next, functions of the connector 11 configured as described above are described.

In the connector 11, a state where the one flat surface 14*a* and the other flat surface 14*b* of each busbar 14 are in contact with the first or second contact portion 17, 19 of the housing 13 via the first or second ceramic member 18, 20 is maintained by the bolt 21 and the nut 22. Thus, it is suppressed that tiny gaps are formed between the respective members, for example, due to dimensional errors, differences in coefficient of liner expansion and the like of the respective members.

Next, effects of this embodiment are described below.

(1) The busbars 14, the first and second ceramic members 18, 20 and the first and second contact portions 17, 19 are collectively fastened by the bolt 21 and the nut 22. Thus, the one flat surface 14*a* of each busbar 14 is maintained in contact with the first contact portion 17 of the housing 13 via the first ceramic member 18 having a high thermal conductivity without any gap, and the other flat surface 14*b* of each busbar 14 is maintained in contact with the second contact portion 19 of the housing 13 via the second ceramic member 20 having a high thermal conductivity without any gap. Thus, the heat dissipation of the busbar 14 is improved.

(2) Since the fastening member is composed of the bolt 21 and the nut 22, the busbars 14, the first and second ceramic members 18, 20 and the first and second contact portions 17, 19 can be easily collectively fastened. Further, the fastening torque is easily controlled, for example, as compared to the case where the fastening member is a rivet or the like.

(3) Each of the first and second contact portions 17, 19 is provided over the pair of busbars 14, and the first and second contact portions 17, 19 are fastened between the pair of busbars 14 by the bolt 21 and the nut 22. Thus, the pair of busbars 14 can be respectively fastened together with the first and second ceramic members 18, 20 by one bolt 21 and one nut 22. That is, the number of components of the fastening member can be reduced as compared to the case where the bolt 21 and the nut 22 are provided for each busbar 14.

(4) Since each of the first and second contact portions 17, 19 is provided over the pair of busbars 14 and each of the first and second ceramic members 18, 20 are provided over the pair of busbars 14, the number of components can be reduced as compared to the case where the first and second ceramic members 18, 20 are provided for each busbar 14.

(5) Since the facing surfaces of the first and second ceramic members 18, 20 facing the busbars 14 are set equal to or longer than the length of the busbars 14 in the width direction of the busbars 14, the busbars 14 can be stably sandwiched by the first and second ceramic members 18, 20. Further, since the busbars 14 can be entirely in contact with the first and second ceramic members 18, 20 in the width direction, heat dissipation is improved.

This embodiment can be modified and carried out as follows. This embodiment and the following modifications can be carried out in combination without technically contradicting each other.

- Although the fastening member is composed of the bolt 21 and the nut 22 in the above embodiment, there is no limitation to this and, for example, another fastening member such as a rivet may be used.
- Although each of the first and second contact portions 17, 19 is provided over the pair of busbars 14 in the above embodiment, there is no limitation to this and the first and second contact portions 17, 19 may be individually provided for each busbar 14.
- Although the first and second contact portions 17, 19 are fastened between the pair of busbars 14 by the bolt 21 and the nut 22 in the above embodiment, there is no limitation to this and the bolt 21 and the nut 22 may be, for example, provided for each busbar 14 and fastened.
- Although each of the first and second ceramic members 18, 20 is provided over the pair of busbars 14 in the above embodiment, there is no limitation to this and first and second ceramic members may be, for example, provided for each busbar 14. Further, the facing surfaces of the first and second ceramic members 18, 20 facing the busbars 14 are set longer than the length of the busbars 14 in the width direction of the busbars 14, there is no limitation to this. For example, these facing surfaces may have the same length as the busbars 14 or may be shorter than the busbars 14.
- Although the connector 11 includes the pair of busbars 14 in the above embodiment, there is no limitation to this and, for example, the connector 11 may include one, three or more busbars.
- Although the housing 13 is made of aluminum in the above embodiment, there is no limitation to this and the housing 13 may be made of another metal material.
- Although the first and second ceramic members 18, 20 are made of alumina in the above embodiment, there is no limitation to this and these ceramic members may be made of another material as long as this material has an insulating property and has a higher thermal conductivity than resin materials and the like.

The present disclosure includes the following implementation examples. Reference signs of the constituent elements of the embodiment are given not for limitation, but for understanding assistance.

[Addendum 1] A connector (11) according to an implementation example of the present disclosure may be provided with:

- a housing (13) made of metal, the housing (13) including a first contact portion (17) and a second contact portion (19);
- a flat plate-like busbar (14);
- a first ceramic member (18);
- a second ceramic member (20); and
- a fastening member (21, 22),
- wherein the first contact portion (17), the first ceramic member (18), the busbar (14), the second ceramic member (20) and the second contact portion (19) may be stacked in this order and fastened to each other by the fastening member (21, 22).

[Addendum 2] A connector (11) according to an implementation example of the present disclosure may be provided with:

- a housing (13) made of metal, the housing (13) including a first contact portion (17) and a second contact portion (19);
- two flat plate-like busbars (14) arranged in a width direction of the busbars (14);
- a first ceramic member (18);
- a second ceramic member (20); and
- a fastening member (21, 22),
- wherein:
- the first contact portion (17), the first ceramic member (18), the two busbars (14), the second ceramic member (20) and the second contact portion (19) may be stacked in this order and fastened to each other by the fastening member (21, 22), and
- the fastening member (21, 22) may be arranged between the two busbars (14) in the width direction.

[Addendum 3] In one or more implementation examples of the present disclosure,

- each busbar (14) may have a first flat surface (**14*a*) and a second flat surface (14*b*) on a side opposite to the first flat surface (14*a***),
- the first flat surface (**14*a*) may be in surface contact with the first ceramic member (18**), and
- the second flat surface (**14*b*) may be in surface contact with the second ceramic member (20**).

[Addendum 4] In one or more implementation examples of the present disclosure, the first contact portion (17) may be in surface contact with the first ceramic member (18).

[Addendum 5] In one or more implementation examples of the present disclosure, the second contact portion (19) may be in surface contact with the second ceramic member (20).

[Addendum 6] In one or more implementation examples of the present disclosure, the fastening member (21) may include a shaft portion (**21*a*) passed through the first contact portion (17), the first ceramic member (18), the second ceramic member (20) and the second contact portion (19**).

[Addendum 7] In one or more implementation examples of the present disclosure, the shaft portion (**21*a*) may be at a position away from the two busbars (14**).

[Addendum 8] In one or more implementation examples of the present disclosure, a length of the busbar (14) or the two busbars (14) in a longitudinal direction may be longer than lengths of the first and second contact portions (17, 19) in the longitudinal direction.

[Addendum 9] In one or more implementation examples of the present disclosure, lengths of the first and second ceramic members (18, 20) in the longitudinal direction may be longer than the lengths of the first and second contact portions (17, 19) in the longitudinal direction.

[Addendum 10] In one or more implementation examples of the present disclosure, the housing (13) may include a first and a second housing constituent members (13*f*, 13*g*) shaped by being divided into two, the first housing constituent member (13*f*) may include the first contact portion (17), and the second housing constituent member (13*g*) may include the second contact portion (19).

[Addendum 11] In one or more implementation examples of the present disclosure, the first and second housing constituent members (13*f*, 13*g*) may be divided bodies divided by a dividing surface extending along both the width direction and longitudinal direction of the busbar (14) or the two busbars (14).

[Addendum 12] In one or more implementation examples of the present disclosure, each of the first and second housing constituent members (13*f*, 13*g*) may include a flange portion (13*b*) configured to be fixed to another member, e.g. an electrical device (12).

[Addendum 13] In one or more implementation examples of the present disclosure, both ends in the width direction of the first and second ceramic members (18, 20) may project in the width direction from the busbar (14) or the two busbars (14).

[Addendum 14] In one or more implementation examples of the present disclosure, lengths of the first and second contact portions (17, 19) in the width direction may be longer than the lengths of the first and second ceramic members (18, 20) in the width direction.

It would be apparent to a person skilled in the art that the present invention may be embodied in other specific forms without departing from the technical concept thereof. For example, some of the components described in the embodiment (or one or more aspects thereof) may be omitted or several components may be combined. The scope of the present invention should be determined with reference to the appended claims, along with the full scope of equivalents to which such claims are entitled.

LIST OF REFERENCE NUMERALS

11 connector
12 electrical device
13 housing
13*a* large tube portion
13*b* flange portion
13*c* inward extending portion
13*d* small tube portion
13*e* fixing hole
13*f*, 13*g* housing constituent member
14 busbar
14*a* one flat surface
14*b* other flat surface
15 wire
15 core wire
16 connection terminal
17 first contact portion
18 first ceramic member
19 second contact member
20 second ceramic member
21 bolt (fastening member)
21*a* shaft portion
22 nut (fastening member)

What is claimed is:

1. A connector, comprising:

a housing made of metal;

a flat plate-like busbar to be held in the housing;

a first ceramic member to be interposed between one flat surface of the busbar and a first contact portion of the housing;

a second ceramic member to be interposed between another flat surface of the busbar and a second contact portion of the housing; and a fastening member for collectively fastening the busbar, the first and second ceramic members and the first and second contact portions.

2. The connector of claim 1, wherein the fastening member is composed of a bolt and a nut.

3. The connector of claim 1, wherein:

a pair of the busbars are provided, each of the first and second contact portions is provided over the pair of busbars, and the fastening member fastens the first and second contact portions between the pair of busbars.

4. The connector of claim 1, wherein:

a pair of the busbars are provided, each of the first and second contact portions is provided over the pair of busbars, and each of the first and second ceramic members is provided over the pair of busbars.

5. The connector of claim 1, wherein facing surfaces of the first and second ceramic members facing the busbar is set equal to or longer than a length of the busbar in a width direction of the busbar.

* * * * *